(12) United States Patent
Ohnishi et al.

(10) Patent No.: US 9,370,900 B2
(45) Date of Patent: Jun. 21, 2016

(54) PRINTING METHOD AND PRINTING DEVICE

(71) Applicant: MIMAKI ENGINEERING CO., LTD., Nagano (JP)

(72) Inventors: Masaru Ohnishi, Nagano (JP); Akifumi Seki, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/418,444

(22) PCT Filed: Aug. 5, 2013

(86) PCT No.: PCT/JP2013/071097
§ 371 (c)(1),
(2) Date: Jan. 30, 2015

(87) PCT Pub. No.: WO2014/024810
PCT Pub. Date: Feb. 13, 2014

(65) Prior Publication Data
US 2015/0183157 A1      Jul. 2, 2015

(30) Foreign Application Priority Data

Aug. 8, 2012 (JP) ................. 2012-176484

(51) Int. Cl.
*B41J 3/407*         (2006.01)
*B29C 67/00*         (2006.01)
*B33Y 10/00*         (2015.01)
(Continued)

(52) U.S. Cl.
CPC ........... *B29C 67/0051* (2013.01); *B41J 3/4073* (2013.01); *B29L 2009/00* (2013.01); *B33Y 10/00* (2014.12); *B33Y 30/00* (2014.12)

(58) Field of Classification Search
CPC ........................ B41J 3/4073; B29C 67/0051
USPC ................................. 347/19–20, 44
See application file for complete search history.

(56) References Cited

U.S. PATENT DOCUMENTS

2012/0287186 A1* 11/2012 Tanaka ................... B41J 2/0451
347/10

FOREIGN PATENT DOCUMENTS

JP          02-102052        4/1990
JP          2002-361858      12/2002
(Continued)

OTHER PUBLICATIONS

"International Search Report (Form PCT/ISA/210)", mailed on Oct. 29, 2013, with English translation thereof, pp. 1-4, in which nine of the listed references (JP02-102052, JP2007-031007, JP2007-268899, JP2008-143046, JP2011-245732, JP2010-149318, JP2002-361858, JP2008-126132 and JP2009-286078) were cited.

(Continued)

*Primary Examiner* — Jason Uhlenhake
(74) *Attorney, Agent, or Firm* — Jianq Chyun IP Office

(57) ABSTRACT

A printing device and method for performing high image quality printing on a three-dimensional object at low cost is provided. The method includes a discharging step that discharges ink onto a recording medium 2 from a print head 1, wherein a blocking wall 3 is provided so as to sandwich a printing region that is a target towards which the ink is discharged along a moving direction of the print head 1 by two surfaces extending along a flight path of ink directed toward the recording medium 2 from the print head 1.

9 Claims, 3 Drawing Sheets

(51) Int. Cl.
 *B33Y 30/00* (2015.01)
 *B29L 9/00* (2006.01)

(56) References Cited

FOREIGN PATENT DOCUMENTS

| JP | 2007-031007 | 2/2007 |
| JP | 2007-268899 | 10/2007 |
| JP | 2008126132 A2 * | 5/2008 |
| JP | 2008-126132 | 6/2008 |
| JP | 2008-143046 | 6/2008 |
| JP | 2009-286078 | 12/2009 |
| JP | 2010-149318 | 7/2010 |
| JP | 2011-245732 | 12/2011 |
| JP | 2012-35552 | 2/2012 |

OTHER PUBLICATIONS

"First Office Action of China Counterpart Application", issued on Oct. 19, 2015, pp. 1-14, with English translation thereof.
"Office Action of Japan Counterpart Application", issued on Dec. 8, 2015, pp. 1-8, with English translation thereof.

* cited by examiner

| Gap | 2mm | 7mm | 12mm |
|---|---|---|---|
| Wall height | - | 5mm | 10mm |
| With wall | - |  |  |
| Without wall |  |  |  |

| Gap | 2mm | 12mm | |
|---|---|---|---|
| Wall height | Without wall | 10mm | Without wall |
| Color printing |  |  |  |

PRINTING METHOD AND PRINTING DEVICE

CROSS-REFERENCE TO RELATED APPLICATION

This application is a 371 application of the International PCT application serial no. PCT/JP2013/071097, filed on Aug 5, 2013, which claims priority benefits of Japan Patent Application No. 2012-176484 filed on Aug 8, 2012. The entirety of each of the above-mentioned patent applications is hereby incorporated by references herein and made a part of this specification.

TECHNICAL FIELD

The present invention relates to a printing method and a printing device.

BACKGROUND ART

As a printing method for printing on a three-dimensional object, a printing method described in Patent Document 1 is known. In the printing method described in Patent Document 1, a head is moved up and down based on both interval data and relative positions between the three-dimensional object that is to be a print target and the ink jet print head, and print performance for the three-dimensional object is improved thereby.

PRIOR ART DOCUMENT

Patent Document

Patent Document 1: JP 2012-35552 A (published on Feb. 23, 2012)

SUMMARY OF THE INVENTION

Problems to be Solved by the Invention

In case where a printing region of a print medium is a flat plane, normally printing is performed on the print medium by discharging ink droplets in the printing region by scanning a print head while providing an interval (gap) of about 2 mm between an ink discharging surface of the ink jet print head and the printing region.

On the other hand, in case where the print medium is a three-dimensional object, a projecting profile is present in the printing region, so the distance between the ink discharging surface of the print head and the printing region is not constant. Due to this, if the gap between the ink discharging surface of the print head and the printing region is set based on a highest position of the projecting profile in the printing region, there is a problem that printing can be performed with high image quality at a position with a short gap (position where the projecting profile in the printing region is high), but the image quality decreases at a position with a long gap (position where the projecting profile in the printing region is low).

According to the printing method described in Patent Document 1, the gap between the printing region of the three-dimensional object and the print head is maintained constant while printing by moving the position of the print head up and down, however, there is a need to measure the distance between the printing region and the print head for an entirety of the printing region before printing, which is troublesome. Further, there is a need to install a means for measuring the distance and the like in the printing device, which is costly.

The present invention has been made in view of the above problem, and the aim is to provide a printing method and a printing device that can perform high image quality printing at low cost on a three-dimensional object.

Solutions to the Problems

To solve the above problem, a printing method according to the present invention includes a discharging step that discharges ink onto a recording medium from a print head, wherein a blocking wall is provided so as to sandwich a printing region that is a target towards which the ink is discharged along a moving direction of the print head by two surfaces extending along a flight path of ink directed toward the recording medium from the print head.

From a unique point of view of the present inventors, one cause of a decrease in ink striking accuracy lies in an influence of cross wind generated by print head scanning that is imposed upon when ink flies toward a recording medium from a print head.

Here, according to the above configuration, in the discharging step, the ink is discharged toward the recording medium from the print head in a state where the blocking wall is provided so as to sandwich the printing region that is the target towards which the ink is discharged along the moving direction of the print head by the two surfaces extending along the flight path of the ink. Accordingly, the influence of the cross wind generated by the print head scanning that the flying ink receives before striking onto the recording medium can be reduced. As a result, the ink striking accuracy is improved, and high image quality printing can be performed. Further, since the decrease in the ink striking accuracy can be prevented even if a moving speed of the print head becomes faster and the cross wind generated therefrom becomes stronger, high image quality printing can be performed without decreasing the moving speed of the print head.

In the printing method according to the present invention, the blocking wall is preferably provided to surround the printing region by surfaces extending along the flight path of the ink.

According to the above configuration, since the ink is discharged toward the recording medium from the print head in the state where the flight path of the ink directed to the printing region is trapped by the blocking wall, the influence of the cross wind received by the flying ink can further be decreased. As a result, printing with even higher accuracy can be performed.

In the printing method according to the present invention, the recording medium preferably has a projecting profile in the printing region.

According to the above configuration, not only in a recording medium not having any projecting profile in the printing region but also in a three-dimensional object having the projecting profile in the printing region, which is a recording medium in which the interval (gap) between the ink discharging surface of the print head and the recording medium varies depending on a printing position, the ink striking accuracy can be improved without moving the print head in an up and down direction. Here, the up and down direction is a direction vertical to the ink discharging surface of the print head. That is, conventionally, in case of using a recording medium having a projecting profile, there was the need to move the print head in the up and down direction so as not to change the distance between the printing region of the recording medium and the ink discharging surface of the print head. On the other hand, according to the present invention, printing can suitably be performed even if the distance between the printing region and the ink discharging surface of the print head is changed, so the movement of the print head in the up and down direction is not necessary.

In a printing method according to the present invention, the blocking wall is preferably provided so that a distance from an end portion of the blocking wall on a print head side to an ink discharging surface of the print head is shorter than an allowable interval between the ink discharging surface of the print head and the recording medium, by which the ink discharged from the print head can be landed onto a desired range on the recording medium in an event of not providing the blocking wall.

According to the above configuration, the blocking wall is provided so that the distance from the end portion of the blocking wall on the print head side to the ink discharging surface of the print head is shorter than the allowable interval between the ink discharging surface of the print head and the recording medium, by which printing can appropriately be performed in the event of not providing the blocking wall. According to this, the influence of the cross wind that is imposed on the ink discharged from the print head toward the recording medium can more efficiently be prevented.

In the printing method according to the present invention, in the discharging step, the distance between the ink discharging surface of the print head and the printing region is preferably set to be equal to or less than a sum of the allowable interval and 10 mm.

According to the above configuration, the distance between the ink discharging surface of the print head and for example the lowest position of the projecting profile in the printing region is set to be equal to or less than the sum of the allowable interval and 10 mm. Due to this, printing with even higher accuracy can be performed.

In the printing method according to the present invention, the print head is installed in a carriage scanning above the recording medium, and in the discharging step, a distance between opposed surfaces of the blocking wall in a scanning direction of the carriage is preferably set to be equal to or less than the length of the carriage in the scanning direction.

According to the above configuration, the length of the carriage itself in the scanning direction becomes longer than the interval in the blocking wall. Due to this, an entirety of the carriage is prevented from being housed in the interval in the blocking wall in the scanning direction. According to this, an opening of a half-closed space configured by the blocking wall and the carriage is prevented from being formed on both front and back in the scanning direction of the carriage, and the air flow from the front of the scanning direction of the carriage passing beneath the carriage and exiting to the back of the carriage is blocked by the blocking wall. According to this, the air flow flowing in beneath the carriage is suppressed, whereby turbulence in the air flow between the carriage and the recording medium can be reduced. As a result, an influence of the turbulence in the air flow imposed on the ink discharged from the print head is reduced, and decrease in the striking accuracy can be prevented.

In the printing method according to the present invention, the blocking wall is preferably a plate-shaped member.

According to the above configuration, the blocking wall can be configured of the plate-shaped member that blocks turbulence in the air flow such as the cross wind directed toward the back of the scan moving direction of the print head, as generated between the print head and the recording medium. According to this, the blocking wall can be configured at low cost, and further can be reduced in weight.

The printing method according to the present invention preferably includes a discharging step that discharges ink onto a recording medium from a print head, wherein a blocking wall is provided so as to sandwich a printing region that is a target towards which the ink is discharged along a moving direction of the print head by two surfaces extending along a flight path of ink directed toward the recording medium from the print head, wherein in the discharging step, the blocking wall is provided to surround the printing region by surfaces extending along the flight path of the ink, the recording medium has a projecting profile in the printing region, the blocking wall is provided so that a distance from an end portion of the blocking wall on a print head side to an ink discharging surface of the print head is shorter than an allowable interval between the ink discharging surface of the print head and the recording medium, by which the ink discharged from the print head can be landed onto a desired range on the recording medium in an event of not providing the blocking wall, a distance between the ink discharging surface of the print head and the printing region is set to be equal to or less than a sum of the allowable interval and 10 mm, and a distance between surfaces of the blocking wall opposed along a moving direction of the print head is set to be equal to or less than a length of a carriage in which the print head is installed and that scans above the recording medium, in a scanning direction.

According to the above configuration, not only in a recording medium not having any projecting profile in the printing region but also in a three-dimensional object having a projecting profile in the printing region, which is a recording medium in which the interval between the ink discharging surface of the print head and the recording medium varies depending on the printing position, even a higher image quality printing can be performed without moving the print head up and down.

A printing device according to the present invention preferably includes: a print head that discharges ink onto a recording medium; and a blocking wall provided so as to sandwich a printing region that is a target toward which the ink is discharged along a moving direction of the print head by two surfaces extending along a flight path of ink directed toward the recording medium from the print head.

According to the above configuration, the advantageous effects that are the same as those of the printing method according to the present invention can be achieved.

Effects of the Invention

According to the printing method and printing device according to the present invention, since ink is discharged onto the recording medium from the print head by providing the blocking wall so as to sandwich the printing region that is the target toward which the ink is discharged along the moving direction of the print head by the two surfaces extending along the flight path of ink directed toward the recording medium from the print head, the advantageous effect of being able to perform high image quality printing at low cost can be achieved.

EMBODIMENTS OF THE INVENTION

[Printing Method]

A printing method according to one embodiment of the present invention is characteristic in including a discharging step that discharges ink onto a recording medium from a print head, wherein a blocking wall is provided so as to sandwich a printing region that is a target towards which the ink is discharged along a moving direction of the print head by two surfaces extending along a flight path of ink directed toward the recording medium from the print head.

The summary of the printing method will be described hereinbelow by referring to FIG. 1, FIG. 2, FIG. 3A to FIG. 3C, and FIG. 4. FIG. 1, FIG. 3A to FIG. 3C, and FIG. 4 are schematic diagrams explaining a printing method according to one embodiment of the present invention, and FIG. 2 is a schematic diagram showing an example of a blocking wall used in the printing method according to one embodiment of the present invention.

Figure 1:
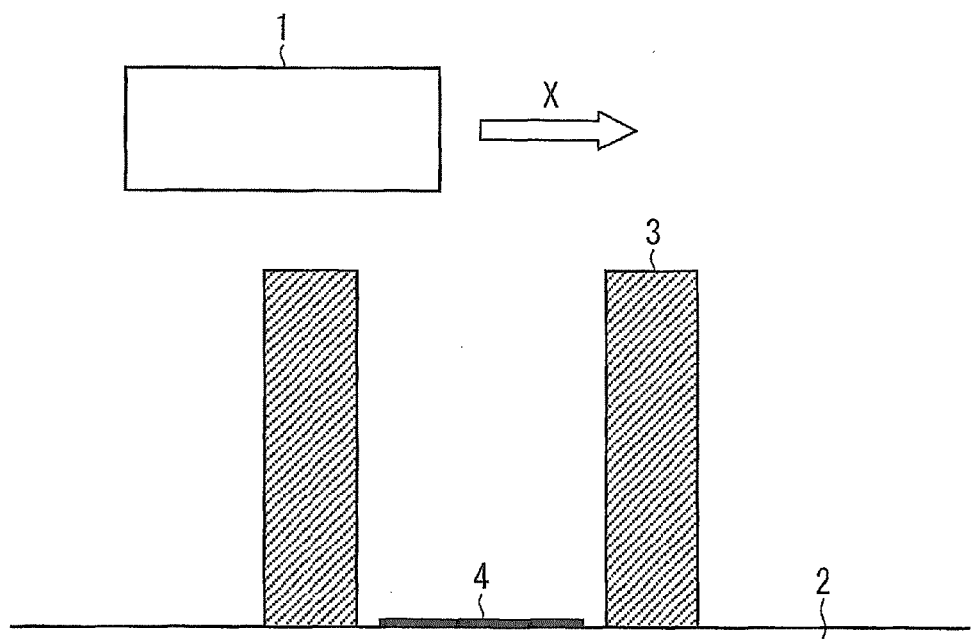
FIG. 1 is a schematic diagram explaining a printing method according to one embodiment of the present invention.

In the discharging step, as shown in FIG. 1, printing is performed by discharging ink from a print head 1 onto a recording medium 2. In discharging the ink from the print head 1 to the recording medium 2, a blocking wall 3 is provided to sandwich a printing region 4 that is a target towards which the ink is discharged. The print head 1 is installed in a carriage (not shown), and moves to scan in a direction of an arrow X in the drawings together with the movement of the carriage.

Figure 2:
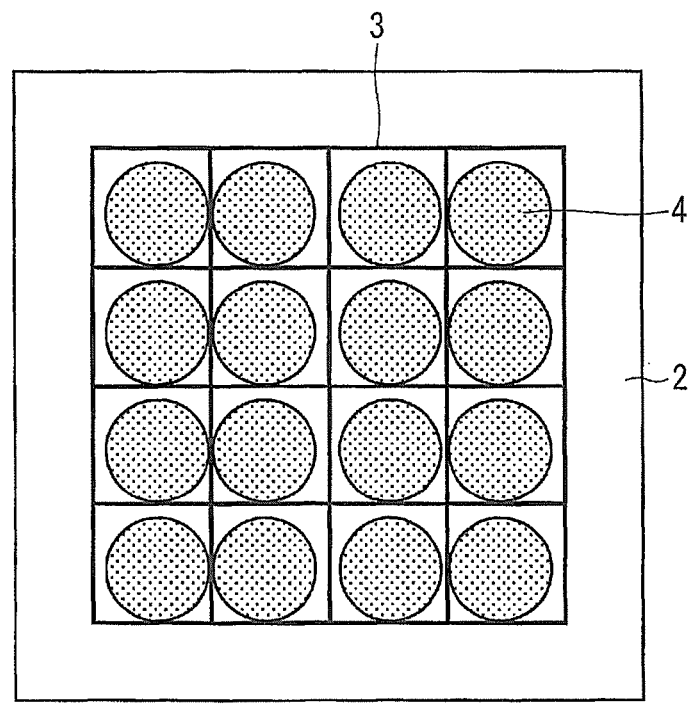
FIG. 2 is a schematic diagram showing an example of a blocking wall used in the printing method according to one embodiment of the present invention.

Here, FIG. 1 shows side surfaces of the blocking wall 3, and FIG. 2 shows an upper surface of the blocking wall 3 in another example. The blocking wall 3 is provided, as shown in FIG. 1, to sandwich the printing region 4 in a moving direction of the print head 1 by two surfaces extending along a flight path of the ink directed toward the recording medium 2 from the print head 1. Accordingly, by sandwiching the printing region 4 by the two surfaces extending along the flight path of the ink, an influence of cross wind that flying ink receives can be reduced as described later. Notably, in the drawings, the printing region 4 is shown by a bold line for the purpose of clarifying the explanation therefor.

Further, as shown in FIG. 2, the blocking wall 3 may be provided to surround the printing region 4 by its surfaces. By the blocking wall 3 being provided to surround the printing region 4, a flight path of the ink is trapped by the blocking wall 3; whereby the influence of the cross wind that the flying ink receives can further be reduced. The blocking wall 3 may be provided to surround each of a plurality of printing regions 4 on the recording medium 2, as shown in FIG. 2.

Figure 3:
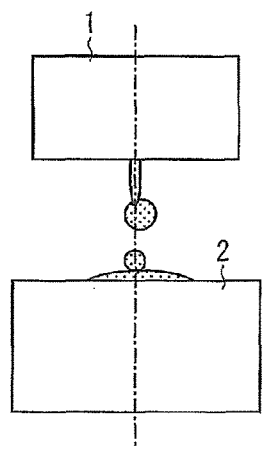
FIG. 3A to FIG. 3C are schematic diagrams explaining the printing method according to one embodiment of the present invention.
Figure 3:
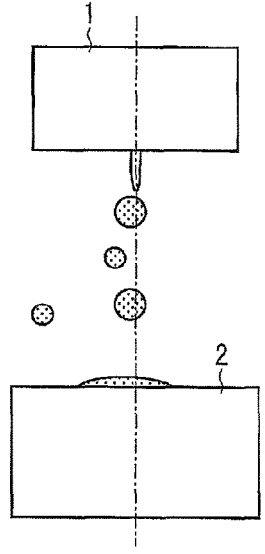
Figure 3:
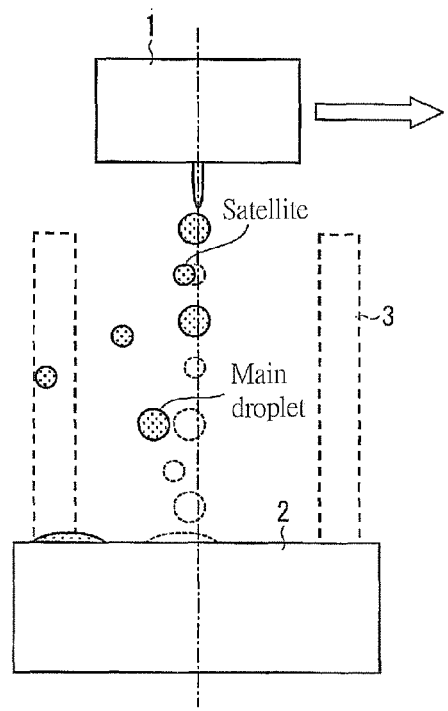

Here, the influence of cross wind that the ink flying from the print head 1 toward the printing region 4 of the recording medium 2 receives will be described. In ink jet printing, the ink that was discharged from the print head 1 strikes onto the recording medium 2 in a form of ink droplets. As this occasion, the ink that was discharged from the print head 1 forms main droplets with relatively large volume and satellites with relatively small volume as shown in FIG. 3C, each of which strikes onto the recording medium 2. As shown in FIG. 3A, in case where a distance (gap) between an ink discharging surface of the print head 1 and the recording medium 2 is short, the main droplets and satellites both pass through a normal flight path shown by a one-dot chain line shown in the drawings, and the ink droplets strike onto a normal striking position. Generally, as shown in FIG. 3A, the ink droplets strike in case where the gap is equal to or less than 3 mm, although this varies depending on a moving speed of the print head 1 and an ink discharging amount.

Here, cross wind directed backward in a moving direction of the print head 1 is generated between the print head 1 and the recording medium 2 accompanying the print head 1 moving while scanning in a direction of an arrow shown in FIG. 3C. As shown in FIG. 3B, when the gap becomes long, the ink discharged from the print head 1 receives an influence of the cross wind, and its flight path is deviated from a normal flight path. This influence of the cross wind is greater for ink droplets with smaller volume, thus, as shown in FIG. 3B, the flight path is greatly deviated for satellites with relatively small volume compared to main droplets, and thereby turned into mist, but a flight path of the main droplets is not significantly deviated, and striking in the vicinity of a normal striking position is realized. Generally, although variation is present depending on a moving speed of the print head 1 and a discharging amount of the ink, the ink droplets strike as shown in FIG. 3B when the gap is equal to or less than about 5 to 8 mm.

On the other hand, as shown in FIG. 3C, when the gap becomes longer, the flight path of the main droplets is deviated significantly as well, whereby the striking takes place while significantly being deviated from the normal striking position. Further, when the gap becomes even longer, both of the satellites and the main droplets turn into mist. Generally, although variation is present depending on the moving speed of the print head 1 and the discharging amount of the ink, the ink droplets strike as shown in FIG. 3C when the gap is equal to or more than about 10 to 5 mm.

In the printing method as in the present embodiment, as shown by broken lines in FIG. 3C, the blocking wall 3 is provided so as to sandwich the printing region of the recording medium 2 in the moving direction of the print head 1 by the two surfaces extending along the flight path of the ink, so the ink becomes more protected against receiving the influence of the cross wind, and the ink droplets strike onto the normal striking position without the flight path deviating even if the gap is long.

Accordingly, generally whether the ink can be made to strike onto a desired range or not is determined in accordance with the gap length. Here, a gap that allows the ink discharged from the print head 1 to strike onto the desired range in the recording medium 2 in case of not providing the blocking wall 3 will be termed an allowable gap (allowable interval). The allowable gap changes according to the types of the print head as well as moving speed and ink discharging amount of the print head, however, printing with higher accuracy is enabled with a shorter gap, and the gap is generally about 2 mm or so.

Figure 4:
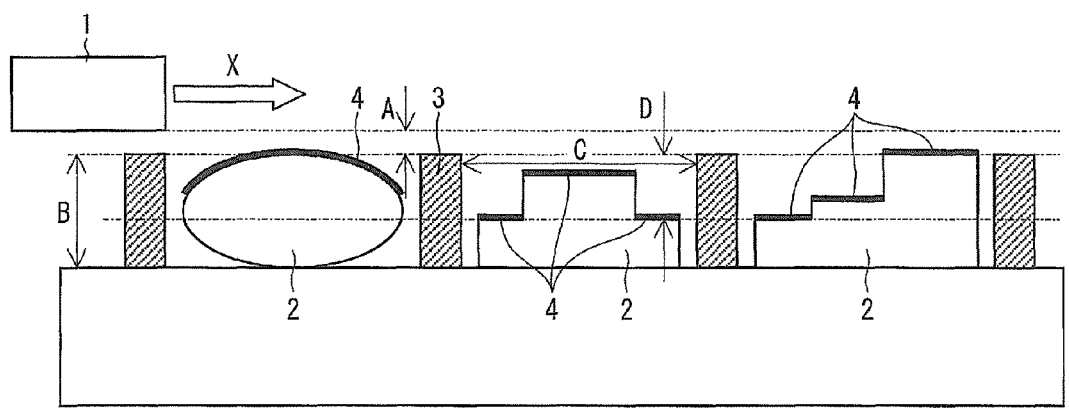
FIG. 4 is a schematic diagram explaining the printing method according to one embodiment of the present invention.

However, in case where the recording medium 2 is a three-dimensional object having projecting profile in the printing region, the gap varies depending on the printing position. For example, in case of the recording medium 2 as shown in FIG. 4, the gap differs for each printing region 4 due to the printing region 4 of the recording medium 2 including various projecting profiles (recesses and projections), and the gap is partially different even within each printing region 4. Accordingly, printing with high image quality can be performed at positions where the gap is short (positions where the projecting profile in the printing region 4 is high), but the image quality is degraded at positions where the gap is long (positions where the projecting profile in the printing region 4 is low).

Here, the projecting profiles that the recording medium 2 includes in the printing regions 4 include not only those having the projecting profile in the printing region 4, but also the printing region 4 being protruded or recessed relative to peripheral surfaces thereof. Especially, in case that the printing region 4 is recessed relative to the peripheral surfaces thereof, the print head 1 cannot be brought close to the printing region 4, whereby the gap is elongated and the image quality is further degraded.

Since printing is performed by providing the blocking wall 3 in the printing method according to the present embodiment, high image quality printing can be performed not only on the recording medium 2 not having any projecting profile but also on the recording medium 2 with which the gap varies depending on the printing position such as in the three-dimensional object having the projecting profile without moving the print head 1 in the up and down direction. Here, the up and down direction is a direction vertical to an ink discharging surface of the print head 1. That is, conventionally, in case of using the recording medium 2 having the projecting profile, the print head 1 needed to be moved in the up and down direction so as not to change the distance between the printing region 4 of the recording medium 2 and the ink discharging surface of the print head 1. On the other hand, according to the printing method of the present embodiment, since printing can suitably be performed even if the distance between the printing region 4 and the ink discharging surface of the print head 1 is changed, so the movement of the print head 1 in the up and down direction is not necessary.

Further, by performing printing by providing the blocking wall 3, the decrease in the ink striking accuracy can be prevented even in the event where the moving speed of the print head 1 becomes fast, and the generated cross wind becomes stronger. Accordingly, highly accurate printing can be performed without decreasing the moving speed of the print head 1.

That is, as shown in FIG. 4, since the scanning direction of the print head 1 is sandwiched in the blocking wall 3 in the printing region 4 of the recording medium 2, the cross wind affecting the ink discharged from the print head 1 toward the printing region 4 can be blocked by the blocking wall 3. Further, as shown in FIG. 4, a distance A from the end portion of the blocking wall 3 on the print head 1 side to the ink discharging surface of the print head 1 is constant. Accordingly, even if the projecting profile is present in the printing region 4 and the gap is partially different, the flight path to a point where the ink strikes onto the respective printing regions 4 is sandwiched by the blocking wall 3. As a result, the influence of the cross wind that the ink receives until striking onto each of the printing regions 4 can be lessened.

According to the printing method of the present embodiment, as will be shown in an embodiment to be described later, the striking accuracy is improved for planar objects not having any projecting profile as well, so the striking accuracy is similarly improved for the three-dimensional object having the projecting profile. Thus, according to the printing method of the present embodiment, high image quality printing can be performed on various types of recording media regardless of being the planar object or the three-dimensional object.

The blocking wall 3 is not particularly limited so long as it is provided to sandwich the printing region 4 in the moving direction of the print head 1 by its two surfaces extending along the flight path of the ink directed toward the recording medium 2 from the print head 1. In other words, the blocking wall 3 will suffice so long as it can block the turbulence in the air flow such as the cross wind directed to a rear side of the scan moving direction of the print head 1, as generated between the print head 1 and the recording medium 2.

Accordingly, the blocking wall 3 can be configured at low cost by a plate-shaped member and the like. Further, by configuring the blocking wall 3 by the plate-shaped member, the blocking wall 3 can be made light-weight. There is no particular limitation as to the material for forming the plate-shaped member configuring the blocking wall 3, however, resin and metal may be exemplified. As an example of a metal plate-shaped member, an aluminum plate may be exemplified. Further, a cardboard may be used as the plate-shaped member configuring the blocking wall 3. Further, the blocking wall 3 may be configured by plate-shaped members being assembled in a lattice shape, as shown in FIG. 2. Notably, in addition to the configuration that surrounds the recording medium 2 by squares as shown in FIG. 2, the blocking wall 3 may be configured to surround the same in a round shape.

Accordingly, the blocking wall 3 has a simple configuration and can easily be adapted to conventional printing devices, so according to the printing method of the present embodiment, high image quality printing can be furnished at low cost.

The distance A from the end portion of the blocking wall 3 on the print head 1 side to the ink discharging surface of the print head 1 is preferably shorter than the allowable gap. For example, it is preferable to set the distance A to be equal to or less than about 2 mm. By making the distance A shorter than the allowable gap, the influence of the cross wind affecting the ink discharged toward the recording medium 2 from the print head 1 can more effectively be prevented.

Further, the distance between the ink discharging surface of the print head 1 and the printing region 4 is preferably equal to or less than the allowable gap+10 mm (sum of the allowable gap and 10 mm). The distance between the ink discharging surface of the print head 1 and the printing region 4 is for example equal to a sum of distances A and D in the recording medium 2 in the middle of FIG. 4. That is, the distance (sum of the distances A and D in FIG. 4) between the ink discharging surface of the print head 1 and the lowest position of the projection profile in the printing region 4 is sufficient to be the allowable gap+10 mm or less. According to this, the influence of the cross wind affecting the ink discharged toward the recording medium 2 from the print head 1 can more effectively be prevented.

Further, in the blocking wall 3, it is preferable that a distance C between opposed surfaces in the scanning direction (direction of arrow X) of the carriage in which the print head 1 is installed is equal to or less than a length of the carriage in the scanning direction. For example, assuming that the print head 1 shown in FIG. 4 and the carriage are of the same size, the length of the print head 1 in a left and right direction of FIG. 4 matches the length of the carriage in the scanning direction. Accordingly, the blocking wall 3 can simply be provided so that the length of the print head 1 in the left and right direction of FIG. 4 is longer than the distance C.

In the blocking wall 3, the generation of the turbulence in the air flow caused between the carriage and the recording medium 2 can be suppressed by the distance C between the opposed surfaces in the scanning direction of the carriage being equal to or less than the length of the carriage in the scanning direction. That is, in case that the distance C is longer than the length of the carriage in the scanning direction, there is a case where opening spaces that are not covered by the blocking wall 3 and the carriage exist at both front and back in the scanning direction of the carriage, in which case the air flow flowing underneath the carriage accompanying the movement of the carriage increases, and the air flow between the carriage and the recording medium 2 may in some cases be disturbed. As a result, the ink discharged from the print head 1 receives the influence of this turbulence in the air flow, whereby the striking accuracy may be decreased. On the other hand, if the distance C is equal to or less than the length in the scanning direction of the carriage, the opening spaces exists only at one of front and back of the carriage in the scanning direction, whereby the air flow flowing in underneath the carriage can be suppressed, and the turbulence in the air flow between the carriage and the recording medium 2 can be reduced. As a result, an influence of the turbulence in the air flow imposed on the ink discharged from the print head 1 is reduced, and the decrease in the striking accuracy can be prevented.

A height of the blocking wall 3 (distance B in FIG. 4) can suitably be set in accordance with a size of the printing region 4 on the recording medium 2 and a degree of the projecting profile and the like. It is preferable for the distance between the ink discharging surface of the print head 1 and the printing region 4 to be equal to or less than the allowable gap+10 mm. In considering that it is preferable for the distance A from the end portion of the blocking wall 3 on the print head 1 side to the ink discharging surface of the print head 1 to be equal to or less than 2 mm, the height of the blocking wall 3 is preferably set to be equal to or less than 10 mm. A thickness of the blocking wall 3 can suitably be set in accordance with the size of the printing region 4 on the recording medium 2 and the scanning speed of the carriage and the like. For example, in case where the scanning speed of the carriage is set to be fast, the thickness of the blocking wall 3 can be set such that a rigidity that can prevent the cross wind would be endowed, even when the generated cross wind becomes stronger.

[Printing Device]

The printing device according to the present invention is characteristic in being provided with a print head that discharges ink onto a recording medium; and a blocking wall provided to sandwich a printing region that is a target toward which the ink is discharged along a moving direction of the print head by its two surfaces extending along a flight path of the ink directed toward the recording medium from the print head. That is, one embodiment implementing the print head and the blocking wall in the printing device according to the present invention is the print head 1 and the blocking wall 3 used in the printing method according to the present invention as aforementioned. Thus, the one embodiment of the printing device according to the present invention is based on the explanation on the printing method according to the present invention as aforementioned.

[Ink]

The ink used in the present invention may suitably be aqueous ink, solvent ink, UV (ultraviolet) curing ink, latex ink in which binder resin containing colorant is dispersed or forms an emulsion in a solvent, solvent-diluted UV (ultraviolet) curing ink, and the like. Especially, in cases where the distance between the ink discharging surface of the print head 1 and the recording medium 2 becomes equal to or more than about 5 mm, the UV (ultraviolet) curing ink that does not harden by the ink discharged from the print head 1 being dried is most appropriate.

A size of ink droplets discharged from the print head 1 is preferably equal to or more than 15 pl, for example, and more preferably equal to or more than 21 pl. By the size of ink droplets being equal to or more than 15 pl, weight of the ink droplets becomes suitably heavy, and the ink droplets flying from the print head 1 to the recording medium 2 become more unlikely to receive the influence of the cross wind.

Example 1

As shown in FIG. 2, an experiment on an effect of the blocking wall 3 on the cross wind generated accompanying the movement of the print head 1 was conducted by discharging the ink form the print head 1 by providing the blocking wall 3 to surround the printing region 4. A printing area was set to be 10 mm×10 mm, and the print head 1 was scanned at a speed of 141 mm/s. The gap (distance from the ink discharging surface of the print head 1 to the recording medium 2) was set respectively 2 mm, 7 mm, and 12 mm. By setting the gap to 7 mm, the printing was performed both in case where the blocking wall 3 is not provided, and in case where the blocking wall 3 with the height of 5 mm is provided. By setting the gap to 12 mm, the printing was performed both in case where the blocking wall 3 is not provided, and in case where the blocking wall 3 with the height of 10 mm is provided.

Figure 5:
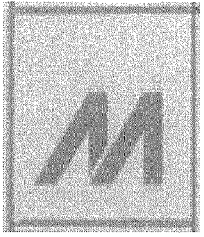
FIG. 5 is a diagram showing a print result comparing the printing method according to one embodiment of the present invention and a conventional printing method.
Figure 5:
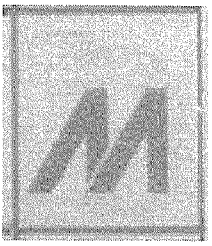
Figure 5:
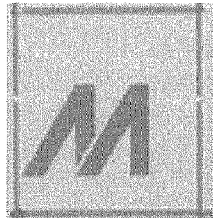
Figure 5:
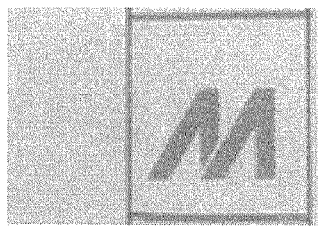
Figure 5:
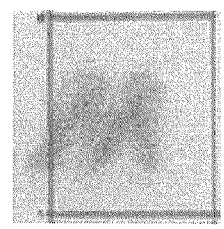

The result is shown in FIG. 5. FIG. 5 is a diagram showing a print result comparing the printing method according to one embodiment of the present invention and the conventional printing method. In FIG. 5, the printing area was indicated by marking the same with a square.

As shown in FIG. 5, the printing was performed with high accuracy in the printing area without providing the blocking wall 3 when the gap is 2 mm. When the gap is 7 mm, the printing was performed more clearly with high accuracy in the case of providing the blocking wall 3, compared to the case of not providing the blocking wall 3. When the gap is 12 mm, in the case of not providing the blocking wall 3, a printed image was deviated from the printing area, and clear printing was not performed. On the other hand, when the gap is 12 mm, the printing was performed in the printing area by providing the blocking wall 3. Further, clear and highly accurate printing was performed when the gap is 12 mm, by providing the blocking wall 3.

Example 2

Similarly to Example 1, an experiment on an influence on color printing was conducted in cases of providing and not providing the blocking wall 3. The printing area was set to be 50 mm (horizontally)×10 mm (vertically), and the print head 1 was scanned at the speed of 141 mm/s. The printing condition was set to be 720×600 dpi/8-pass/single direction printing/ink droplet size 21 pl. The gap was set to be 2 mm and 12 mm. By setting the gap to 12 mm, the printing was performed both in case where the blocking wall 3 is not provided, and in case where the blocking wall 3 with the height of 10 mm is provided.

Figure 6:
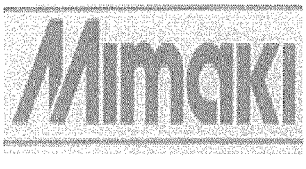
FIG. 6 is a diagram showing a print result comparing the printing method according to one embodiment of the present invention and the conventional printing method.
Figure 6:
Figure 6:

The result is shown in FIG. 6. FIG. 6 is a diagram showing a print result comparing the printing method according to one embodiment of the present invention and the conventional printing method. Notably, in FIG. 6, the result of having performed the color printing under the above printing condition is shown in gray scale.

As shown in FIG. 6, when the gap is 2 mm, the printing was performed with high accuracy even without providing the blocking wall 3. When the gap is 12 mm, the printing was performed with accuracy in the case of providing the blocking wall 3, whereas in the case of not providing the blocking wall 3, the printing was not performed highly accurately by deviations being generated between colors.

[Supplementary Information]

To solve the above problem, the printing method according to the present embodiment includes a discharging step that discharges ink onto the recording medium 2 from the print head 1 by providing the blocking wall 3 so as to sandwich the printing region 4 that is the target towards which the ink is discharged along the moving direction of the print head 1 by its two surfaces extending along the flight path of the ink directed toward the recording medium 2 from the print head 1 that discharges the ink.

According to the unique findings of the inventors, one cause of the ink striking accuracy reduction lies in that the influence of the cross wind that is generated by scanning of the print head 1 upon the ink flying toward the printing region 4 from the print head 1 is received.

Here, according to the above configuration, in the discharging step, the ink is discharged from the print head 1 toward the recording medium 2 in the state of having provided the blocking wall 3 so as to sandwich the printing region 4 that is the target towards which the ink is discharged along the moving direction of the print head 1 by the two surfaces extending along the flight path of the ink. Accordingly, the influence of the cross wind generated by the print head 1 scanning that the flying ink receives before striking onto the recording medium 2 can be reduced. As a result, the ink striking accuracy is improved, and high image quality printing can be performed. Further, since the decrease in the ink striking accuracy can be prevented even if a moving speed of the print head 1 becomes faster and the cross wind generated therefrom becomes stronger, high image quality printing can be performed without decreasing the moving speed of the print head 1.

In the printing method according to the embodiment, the blocking wall 3 is provided to surround the printing region 4 by its surfaces extending along the flight path of the ink.

According to the above configuration, since the ink is discharged toward the recording medium 2 from the print head 1 in the state where the flight path of the ink directed is trapped by the blocking wall 3, the influence of the cross wind received by the flying ink can further be decreased. As a result, printing with even higher accuracy can be performed.

In the printing method according to the present invention, the recording medium 2 includes the projecting profile in the printing region 4.

According to the above configuration, not only in a recording medium not having any projecting profile in the printing region but also in the three-dimensional object having the projecting profile in the printing region 4, which is the recording medium 2 in which the interval (gap) between the ink discharging surface of the print head 1 and the recording medium 2 varies depending on the printing position, the ink striking accuracy can be improved without moving the print head 1 in an up and down direction. Here, the up and down direction is a direction vertical to an ink discharging surface of the print head 1. That is, conventionally, in case of using the recording medium 2 having the projecting profile, the print head 1 needed to be moved in the up and down direction so as not to change the distance between the printing region 4 and the ink discharging surface of the print head 1. On the other hand, according to the present invention, printing can suitably be performed even if the distance between the printing region 4 and the ink discharging surface of the print head 1 is changed, so the movement of the print head 1 in the up and down direction is not necessary.

In the printing method according to the present embodiment, in the discharging step, the blocking wall 3 is provided so that the distance from the end portion of the blocking wall 3 on the print head 1 side to the ink discharging surface of the print head 1 is shorter than the allowable interval between the ink discharging surface of the print head 1 and the recording medium 2, by which the ink discharged from the print head 1 can be landed onto the desired range on the recording medium 2 in the event of not providing the blocking wall 3.

According to the above configuration, the blocking wall 3 is provided so that the distance from the end portion of the blocking wall 3 on the print head 1 side to the ink discharging surface of the print head 1 is shorter than the allowable interval between the ink discharging surface of the print head 1 and the recording medium 2, by which printing can appropriately be performed in the event of not providing the blocking wall 3. According to this, the influence of the cross wind affecting the ink discharged toward the recording medium 2 from the print head 1 can more effectively be prevented.

In the printing method according to the present embodiment, in the discharging step, the distance between the ink discharging surface of the print head 1 and the printing region 4 is set to be equal to or less than the sum of the allowable interval and 10 mm.

According to the above configuration, the distance between the ink discharging surface of the print head 1 and for example the lowest position of the projecting profile in the printing region 4 is set to be equal to or less than the sum of the allowable interval and 10 mm. Due to this, printing with even higher accuracy can be performed.

In the printing method according to the present invention, the print head 1 is installed in the carriage scanning above the recording medium 2, and in the discharging step, the distance between the opposed surfaces of the blocking wall 3 in the scanning direction of the carriage is set to be equal to or less than the length of the carriage in the scanning direction.

According to the above configuration, the length of the carriage itself in the scanning direction becomes longer than the interval in the blocking wall 3. Due to this, an entirety of the carriage is prevented from being housed in the interval in the blocking wall 3 in the scanning direction. According to this, an opening of a half-closed space configured by the blocking wall 3 and the carriage is prevented from being formed on both front and back in the scanning direction of the carriage, and the air flow from the front in the scanning direction of the carriage passing beneath the carriage and exiting to the back of the carriage is blocked by the blocking wall 3. According to this, the air flow flowing in beneath the carriage is suppressed, whereby turbulence in the air flow between the carriage and the recording medium 2 can be reduced. As a result, an influence of the turbulence in the air flow imposed on the ink discharged from the print head 1 is reduced, and the decrease in the striking accuracy can be prevented.

In the printing method according to the present invention, the blocking wall is a plate-shaped member.

According to the above configuration, the blocking wall 3 can be configured of the plate-shaped member that blocks the turbulence in the air flow such as the cross wind directed toward the back of the scan moving direction of the print head 1, as generated between the print head 1 and the recording medium 2. According to this, the blocking wall 3 can be configured at low cost, and further can be reduced in weight.

The printing method according to the present embodiment includes the discharging step that discharges ink onto the recording medium 2 from the print head 1, wherein the blocking wall 3 is provided so as to sandwich the printing region 4 that is the target towards which the ink is discharged along the moving direction of the print head 1 by its two surfaces thereof extending along the flight path of ink directed toward the recording medium 2 from the print head 1 that discharges ink, wherein in the discharging step, the blocking wall 3 is provided to surround the printing region 4 by its surfaces extending along the flight path of the ink, the recording medium 2 has the projecting profile in the printing region 4, the blocking wall 3 is provided so that the distance from the end portion of the blocking wall 3 on the print head 1 side to the ink discharging surface of the print head 1 is shorter than the allowable interval between the ink discharging surface of the print head 1 and the recording medium 2, by which the ink discharged from the print head 1 can be landed onto the desired range on the recording medium 2 in the event of not providing the blocking wall 3, the distance between the ink discharging surface of the print head 1 and the printing region 4 is set to be equal to or less than the sum of the allowable interval and 10 mm, and the distance between the surfaces of the blocking wall 3 opposed along the moving direction of the print head 1 is set to be equal to or less than the length of the carriage in which the print head is installed and that scans above the recording medium 2, in the scanning direction.

According to the above configuration, not only in the recording medium 2 not having any projecting profile in the printing region 4 but also in the three-dimensional object having the projecting profile in the printing region 4, which is the recording medium 2 in which the interval between the ink discharging surface of the print head 1 and the recording medium 2 varies depending on the printing position, even higher image quality printing can be performed without moving the print head 1 up and down.

A printing device according to the present embodiment includes: the print head 1 that discharges ink onto the recording medium 2; and the blocking wall 3 provided so as to sandwich the printing region 4 that is the target towards which the ink is discharged along the moving direction of the print head 1 by its two surfaces extending along the flight path of ink directed toward the recording medium 2 from the print head 1.

According to the above configuration, the advantageous effects of that are the same as those of the printing method according to the present embodiment can be achieved.

The present invention is not limited to the aforementioned embodiments; and various modifications within the scope indicated by the Claims can be made, and the embodiments obtained by suitably combining the technical means disclosed in the embodiment are also included in the technical scope of the present invention.

INDUSTRIAL APPLICABILITY

The invention can be used in ink jet printing.

The invention claimed is:
1. A printing method comprising:
a discharging step that discharges an ink onto a recording medium from a print head, wherein a blocking wall having at least two surfaces extending along a flight path of the ink directed toward the recording medium from the print head is provided;
wherein the recording medium is a three-dimensional object, the print head moves in front and back directions, the at least two surfaces sandwich the recording medium when printing is performed in one of the front and back directions, and a height of the blocking wall along the flight path of the ink from a table that the three-dimensional object is placed is same as or higher than a top of the three-dimensional object.
2. The printing method according to claim 1, wherein the blocking wall is provided to surround a printing region by the at least two surfaces extending along the flight path of the ink.
3. The printing method according to claim 2, wherein the recording medium has a projecting profile in the printing region.
4. The printing method according to claim 1, wherein in the discharging step,
the blocking wall is configured that a distance from an end portion of the blocking wall on a side of the print head to an ink discharging surface of the print head is shorter than an allowable interval between the ink discharging surface of the print head and the recording medium, by which the ink discharged from the print head is landed onto a desired range of the recording medium when the blocking wall is not disposed.
5. The printing method according to claim 4, wherein in the discharging step, the distance between the ink discharging surface of the print head and the printing region is set to be equal to or less than a sum of the allowable interval and 10 mm.
6. The printing method according to claim 1, wherein the print head is installed in a carriage scanning above the recording medium, and
in the discharging step, a distance between opposed surfaces of the blocking wall in a scanning direction of the carriage is set to be equal to or less than a length of the carriage in the scanning direction.
7. The printing method according to claim 1, wherein the blocking wall is a plate-shaped member.
8. A printing method comprising:
a discharging step that discharges an ink onto a recording medium from a print head, wherein a blocking wall having at least two surfaces extending along a flight path of the ink directed toward the recording medium from the print head is provided; wherein the recording medium is a three-dimensional object,
the print head moves in front and back directions, the at least two surfaces sandwich the recording medium when printing is performed in one of the front and back directions, and a height of the blocking wall along the flight path of the ink from a table that the three-dimensional object is placed is same as or higher than a top of the three-dimensional object,
in the discharging step,
the blocking wall is provided to surround the printing region by the at least two surfaces extending along the flight path of the ink,
the recording medium has a projecting profile in the printing region,
the blocking wall is configured that a distance from an end portion of the blocking wall on a side of the print head to an ink discharging surface of the print head is shorter than an allowable interval between the ink discharging surface of the print head and the recording medium, by which the ink discharged from the print head is landed onto a desired range on the recording medium when the blocking wall is not disposed,
the distance between the ink discharging surface of the print head and the printing region is set to be equal to or less than a sum of the allowable interval and 10 mm, and
a distance between opposed surfaces of the blocking wall in the moving direction of the print head is set to be equal to or less than a length of a carriage that scans above the recording medium, in a scanning direction.

9. A printing device comprising:
a print head that discharges an ink onto a recording medium, wherein the recording medium is a three-dimensional object; and
a blocking wall having at least two surfaces extending along a flight path of the ink directed toward the recording medium from the print head,
wherein the print head moves in front and back directions, the at least two surfaces sandwich the recording medium when printing is performed in one of the front and back directions, and a height of the blocking wall along the flight path of the ink from a table that the three-dimensional object is placed is same as or higher than a top of the three-dimensional object.

* * * * *